(12) United States Patent
Kim et al.

(10) Patent No.: US 11,590,445 B2
(45) Date of Patent: Feb. 28, 2023

(54) APPARATUS FOR TREATING WASTE GAS OF ELECTRONICS INDUSTRY

(71) Applicant: MAT PLUS CO., LTD., Anseong-si (KR)

(72) Inventors: Dong Soo Kim, Anseong-si (KR); Chul Hwan Kim, Pyeongtaek-si (KR); Hyun Kyung Kim, Pyeongtaek-si (KR)

( * ) Notice: Subject to any disclaimer, the term of this patent is extended or adjusted under 35 U.S.C. 154(b) by 46 days.

(21) Appl. No.: 17/371,005

(22) Filed: Jul. 8, 2021

(65) Prior Publication Data
US 2022/0387922 A1    Dec. 8, 2022

(30) Foreign Application Priority Data

Jun. 4, 2021   (KR) .................. 10-2021-0072579

(51) Int. Cl.
*B01D 53/00*    (2006.01)
*B01D 53/86*    (2006.01)
*B01D 53/04*    (2006.01)
*B01D 53/76*    (2006.01)

(52) U.S. Cl.
CPC ........... *B01D 53/005* (2013.01); *B01D 53/04* (2013.01); *B01D 53/76* (2013.01); *B01D 53/869* (2013.01);
(Continued)

(58) Field of Classification Search
CPC ...... B01D 53/005; B01D 53/04; B01D 53/76; B01D 53/8625; B01D 53/869;
(Continued)

(56) References Cited

U.S. PATENT DOCUMENTS 4,165,576 A * 8/1979 Joselevich ................. G09F 7/02
                                                        40/620
5,320,052 A * 6/1994 Spokoyny ............... B03C 3/013
                                                       422/177
(Continued)

FOREIGN PATENT DOCUMENTS

KR    10-1720086    3/2017

OTHER PUBLICATIONS

English Specification of 10-1720086.

*Primary Examiner* — Tom P Duong
(74) *Attorney, Agent, or Firm* — Antonio Ha & U.S. Patent, LLC

(57) ABSTRACT

Provided is an apparatus for treating waste gas of the electronics industry, and the apparatus includes: a reaction chamber in which an inlet and an outlet are formed and an inner space for purifying waste gas is formed; a first partition plate extending from an inner wall of the reaction chamber facing the inlet in a direction toward the inlet, dividing the inner space into a pre-treatment zone for collecting dust in the waste gas and a remaining purification zone; a second partition plate extending vertically downward from a ceiling of the reaction chamber, dividing the purification zone into a thermal decomposition zone for heating and thermally decomposing waste gas and a post-treatment zone; and a heater installed at the ceiling of the reaction chamber so as to be located in the thermal decomposition zone to thermally decompose a perfluorinated compound by heating waste gas introduced into the thermal decomposition zone; and a dry scrubber unit including one or more catalysts to collect at least one of the dust, a fluorine compound, and nitrous oxide (N2O) in waste gas introduced into the post-treatment zone.

9 Claims, 2 Drawing Sheets

(52) U.S. Cl.
CPC .. *B01D 53/8625* (2013.01); *B01D 2257/2066* (2013.01); *B01D 2257/404* (2013.01); *B01D 2258/0216* (2013.01)

(58) Field of Classification Search
CPC ...... B01D 2257/2066; B01D 2257/404; B01D 2258/0216
USPC ........................................................ 422/168
See application file for complete search history.

(56) References Cited

U.S. PATENT DOCUMENTS

| | | | | |
|---|---|---|---|---|
| 5,407,647 | A * | 4/1995 | Tarancon | B01J 8/048 422/174 |
| 5,538,539 | A * | 7/1996 | Spokoyny | F23J 3/00 96/60 |
| 5,582,802 | A * | 12/1996 | Spokoyny | B01D 53/8609 422/177 |
| 6,694,900 | B2 * | 2/2004 | Lissianski | F23G 7/07 110/344 |
| 7,168,947 | B2 * | 1/2007 | Zamansky | F23G 7/07 431/2 |
| 9,192,890 | B2 * | 11/2015 | Warren | B01D 53/8631 |
| 2010/0186593 | A1 * | 7/2010 | Kim | B01D 53/323 96/57 |
| 2012/0219462 | A1 * | 8/2012 | Nozaki | A62B 9/02 96/138 |
| 2013/0334466 | A1 * | 12/2013 | Gadgil | F23J 15/003 252/373 |
| 2015/0139882 | A1 * | 5/2015 | Warren | F23J 15/003 423/244.07 |

* cited by examiner

APPARATUS FOR TREATING WASTE GAS OF ELECTRONICS INDUSTRY

CROSS-REFERENCE TO RELATED APPLICATION(S)

This application claims priority to Korean Patent Application No. 10-2021-0072579 filed in the Korean Intellectual Property Office on Jun. 4, 2021, the disclosure of which is incorporated by reference herein in its entirety.

BACKGROUND OF THE DISCLOSURE

Field of the Disclosure

The present disclosure relates to an apparatus for treating waste gas of the electronics industry, and more particularly, to an apparatus for treating waste gas of the electronics industry, the apparatus which purifies and discharges pollutants contained in the waste gas generated in the electronics industry that manufactures displays, semiconductors, etc.

Related Art

In general, in the electronics industry that manufactures LEDs, LCDs, and the like, various processes such as diffusion, etching, and deposition are repeatedly performed on a substrate, and most of these processes are to supply a process gas to the inside of a sealed process chamber to cause reaction on the wafer, and various types of process gases are used in each process.

In this case, process gas with strong properties such as toxicity, flammability, and corrosiveness is mainly used, and only a part of the used process gas participates in the reaction and the remaining process gas is discharged in an unreacted state.

Due to the characteristics of the process gas discharged in the unreacted state, the process gas may, when discharged into the atmosphere without a separate purification process, cause damage to surrounding facilities and safety accidents for workers, as well as serious environmental pollution, and thus, various purification devices such as a thermal decomposition reactor, a catalytic reactor, a scrubber, and the like are installed to purify and discharge waste gas generated in the electronics industry.

Among the above purification devices, the scrubber may be classified into dry, wet, or mixed types, and a wet scrubber uses water to clean and cool waste gas, has a relatively simple structure, and is easy to manufacture and increase in capacity, which are advantageous in treating soluble perfluorinated compounds, and thus, the wet scrubber is mainly used to purify waste gas containing a large amount of perfluorinated compounds generated in the electronics industry.

However, due to the difficulty in securing sufficient water for treatment, the demand for a technology capable of treating waste gas in the electronic industry such as semiconductors in a dry manner has been increasing in recent years.

In addition, when a scrubber is installed in the inside of fabrication line (FAB), for example, a POU (Point of Use) scrubber, there are restrictions when it comes an installation area, and accordingly, the demand for an apparatus for treating waste gas, the apparatus in which various treatment devices such as a thermal decomposition reactor, a catalytic reactor, and a scrubber are integrally provided, is gradually increasing.

The description provided above as a related art of the present disclosure is just for helping understanding the background of the present disclosure and should not be construed as being included in the related art known by those skilled in the art.

RELATED ART DOCUMENT

Patent Document

Korean Patent No. 10-1720086 B1 (Mar. 21, 2017)

SUMMARY

The present disclosure provides an apparatus for treating waste gas of the electronics industry, the apparatus which is capable of minimizing a volume thereof by integrally integrating a thermal decomposition reactor, a catalytic reactor, a scrubber, and the like.

The present disclosure also provides an apparatus for treating waste gas of the electronics industry, the apparatus which is capable of purifying and discharging pollutants in the waste gas of the electronic industry in a dry manner.

The present disclosure also provides an apparatus for treating waste gas of the electronics industry, the apparatus which is capable of simultaneously treating a perfluorinated compound, dust, and nitrogen oxide (NOx).

The technical problems to be achieved by the present disclosure are not limited to the technical problems mentioned above, and other technical problems not mentioned will be clearly understood by those of ordinary skill in the art from the description of the present disclosure.

In a general aspect, there is provided an apparatus for treating waste gas of electronic industry, and the apparatus includes: a reaction chamber in which an inlet and an outlet are formed and an inner space for purifying waste gas is formed; a first partition plate extending from an inner wall of the reaction chamber, facing the inlet, in a direction toward the inlet to divide the inner space into a pre-treatment zone for collecting dust in the waste gas and a remaining purification zone; a second partition plate extending vertically downward from a ceiling of the reaction chamber to divide the purification zone into a thermal decomposition zone for heating and thermally decomposing waste gas and a post-treatment zone; and a heater installed at the ceiling of the reaction chamber so as to be located in the thermal decomposition zone to thermally decompose a perfluorinated compound by heating waste gas introduced into the thermal decomposition zone; and a dry scrubber unit comprising one or more catalysts to collect at least one of the dust, a fluorine compound, and nitrous oxide ($N_2O$) in waste gas introduced into the post-treatment zone.

Preferably, the first partition plate may be installed inclined upwardly in the direction toward the inlet from the inner wall of the reaction chamber, and a plurality of first collecting protrusions may be formed to be spaced apart from each other in longitudinal and transverse directions on top and bottom surfaces of the first partition plate.

In the present disclosure, the first partition plate may further include a dust gate installed adjacent to the reaction chamber to discharge dust collected on the top surface of the first partition plate to the pre-treatment zone.

More preferably, the apparatus for treating waste gas of the electronics industry according to an embodiment of the present disclosure may further include a third partition plate extending upwardly from an end portion of the first partition plate so as to prevent a dust inflow and a heat loss into the thermal decomposition zone.

The inlet according to an embodiment of the present disclosure may be preferably bent downward to supply waste gas to a bottom of the inner space.

The reaction chamber may further include a plurality of second collecting protrusions formed to be spaced apart in longitudinal and transverse directions, each protrusion formed in a quadrangular pyramid shape of which cross-sectional area increases from one side to the other side of the reaction chamber having the inlet formed therein so that dust deposited on the bottom of the inner space is prevented from flowing backward.

The dry scrubber unit may include: a first catalyst part configured to adsorb and treat the fluorine compound in the waste gas heated by the heater; and a heat exchange part installed at a rear end of the first catalyst part in a flow direction of waste gas to recover waste heat of the waste gas heated by the heater.

More preferably, the dry scrubber unit may include a second catalyst part installed between the first catalyst part and the heat exchange part to decompose and remove the nitrous oxide (N2O) in the waste gas heated by the heater.

In addition, the dry scrubber unit may further include a third catalyst part installed at a front end of the heat exchange part to adsorb and remove the dust in the waste gas.

According to an embodiment of the present disclosure, as dust collection, thermal decomposition, and scrubber functions are performed in one reaction chamber to simultaneously treat a number of contaminants included in waste gas of the electronics industry, such as dust, a perfluorinated compound, and nitrous oxide, it is possible to minimize the volume, thereby reducing installation restrictions.

In addition, since pollutants is purified in a dry method, no separate process water is required, thereby minimizing installation restrictions, and since secondary pollutants such as wastewater are not generated, treatment efficiency and cost may be improved.

DESCRIPTION OF EXEMPLARY EMBODIMENTS

Hereinafter, a preferred embodiment of the present invention will be described in detail with reference to the accompanying drawings, but the present disclosure is not limited by the embodiment. For reference, like numerals substantially refer to like elements throughout the drawings so they can be cited from other drawings in the following description, and contents that are determined to be apparent to those skilled in the art or are repeated can be omitted.

The present disclosure relates to an apparatus for treating waste gas of the electronics industry, the apparatus which minimizes a volume thereof while a dust collector, a thermal decomposition reactor, a catalytic reactor, and a scrubber are integrally provided to simultaneously treat various types of harmful substances.

In addition, the apparatus is configured to remove contaminants in a dry manner, so that it does not require separate process water and further minimizes the generation of secondary contaminants such as wastewater.

Figure 1:
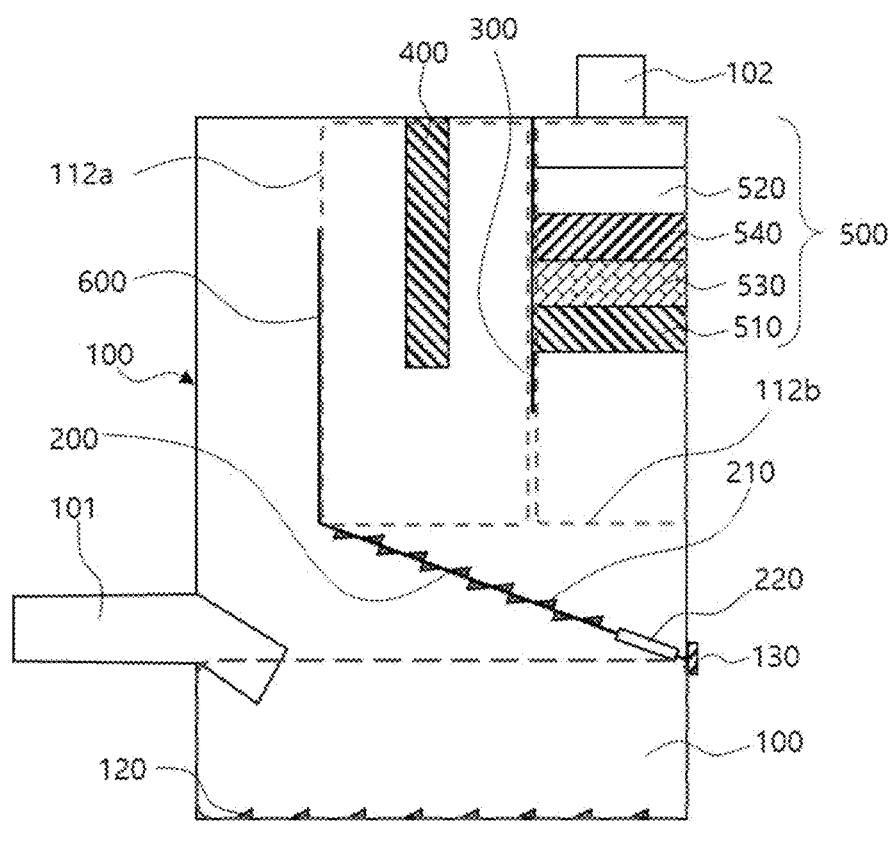
FIG. 1 is a side cross-sectional view for explaining an apparatus for treating waste gas of the electronics industry according to an embodiment of the present disclosure.

FIG. 1 is a side cross-sectional view for explanation of an apparatus for treating waste gas of the electronics industry according to an embodiment of the present disclosure.

As shown in FIG. 1, the apparatus for treating waste gas of the electronics industry according to an embodiment of the present disclosure includes a reaction chamber 100 having an inner space 110 in which harmful substances contained in waste gas are treated, a first partition plate 200 dividing the inner space 110 into a pre-treatment zone 111 and a purification zone 112, a second partition plate 300 dividing the purification zone 112 into a thermal decomposition zone 112a and a post-treatment zone 112b, a heater 400 installed in the thermal decomposition zone 112a to purify a perfluorinated compound, and a dry scrubber unit 500 installed in the post-treatment zone 112b to treat at least one of a fluorine compound or nitrous oxide (N2O).

The reaction chamber 100 has an inlet 101 formed in a side surface of one side, through which waste gas is introduced, and an outlet 102 formed in an upper portion of the other side, through which the treated waste gas is discharged, and the reaction chamber 100 is formed in the shape of a housing with the inner space 110 in which pollutants among the waste gas introduced through the inlet 101 are purified.

In the present disclosure, the inner space 110 of the reaction chamber 100 is largely divided into the pre-treatment zone 111 and the purification zone 112 by types of the contaminants to be treated.

The pre-treatment zone 111 is a zone for primarily removing dust contained in the waste gas introduced into the reaction chamber 100 through the inlet 101, and the purification zone 112 includes the thermal decomposition zone 112a for heating thermally decomposing a perfluorinated compound generated in large amounts in electronics industry, and the post-treatment zone 112b for treating dust, nitrous oxide, and the like generated in the thermal decomposition process.

The reaction chamber 100 according to an embodiment of the present disclosure may be formed of various materials, but since the temperatures of the pre-treatment zone 111, the thermal decomposition zone 112a, and the post-treatment zone 112b are different from each other, the reaction chamber 100 may be formed of different materials depending on a process temperature of each zone.

For example, the thermal decomposition zone 112a is a zone maintained at a higher temperature compared to the pre-treatment zone 111 and the post-treatment zone 112b, and an inner wall of the reaction chamber 100 on the side of the thermal decomposition zone 112a and the first and second partition plates 200 and 300 are preferably formed of a material having excellent heat resistance, and a coating layer having excellent heat resistance, such as ceramic, may be formed and used depending on operating temperature.

Accordingly, it is possible to prevent damage to the pre-treatment zone 111 or the post-treatment zone 112b due to the high temperature of the thermal decomposition zone 112a, and to reduce the waste gas treatment cost by minimizing a heat loss.

The first partition plate 200 is preferably formed to extend from the inner wall of the other side of the reaction chamber 100 in an upwardly inclined direction toward the inlet 101 so as to divide the inner space 110 into the pre-treatment zone 111 for primarily collecting dust in the waste gas and the remaining purification zone 112.

Accordingly, it is possible to improve the dust collection efficiency by improving the chance and time of contact with the waste gas, to minimize a pressure loss by guiding the flow of the waste gas, and to improve the processing efficiency by smoothing the flow.

At this point, it is preferable that the inlet 101 according to an embodiment of the present disclosure is bent downward in a direction toward the inner wall of the other side of the reaction chamber 100.

It is because, by guiding the flow of the waste gas so that the waste gas first comes into contact with the bottom surface of the reaction chamber 100 and then is supplied to the purification zone 112 disposed at the rear end along the bottom surface of the first partition plate 200, it is possible to improve the processing efficiency by increasing the contact chance and time while smoothing the flow of the waste gas.

More preferably, the first partition plate 200 according to an embodiment of the present disclosure further includes a dust gate 220 installed adjacent to the inner wall of the other side of the reaction chamber 100 so as to discharge the dust and foreign substances deposited thereon downward.

Accordingly, the dust deposited on a top surface of the first partition plate 200 moves in the direction toward the dust gate 220 along the inclination of the first partition plate 200, and by operating the opening and closing of the dust gate 220 according to a preset time or a preset amount of dust deposited to discharge the dust deposited on the first partition plate 200 to the pre-treatment zone 111 located below, it is possible to facilitate maintenance and extend a maintenance cycle to thereby increase productivity.

In addition, in the first partition plate 200 according to an embodiment of the present disclosure, it is preferable that a plurality of first collecting protrusions 210 are formed to be spaced apart from each other by a predetermined distance in longitudinal and transverse directions on the top and bottom surfaces of the first partition plate 200, and it is preferable that a plurality of second collecting protrusions 120 are formed in the bottom surface of the reaction chamber 100 in the same shape and arrangement as the first collecting protrusions 210.

Figure 2:
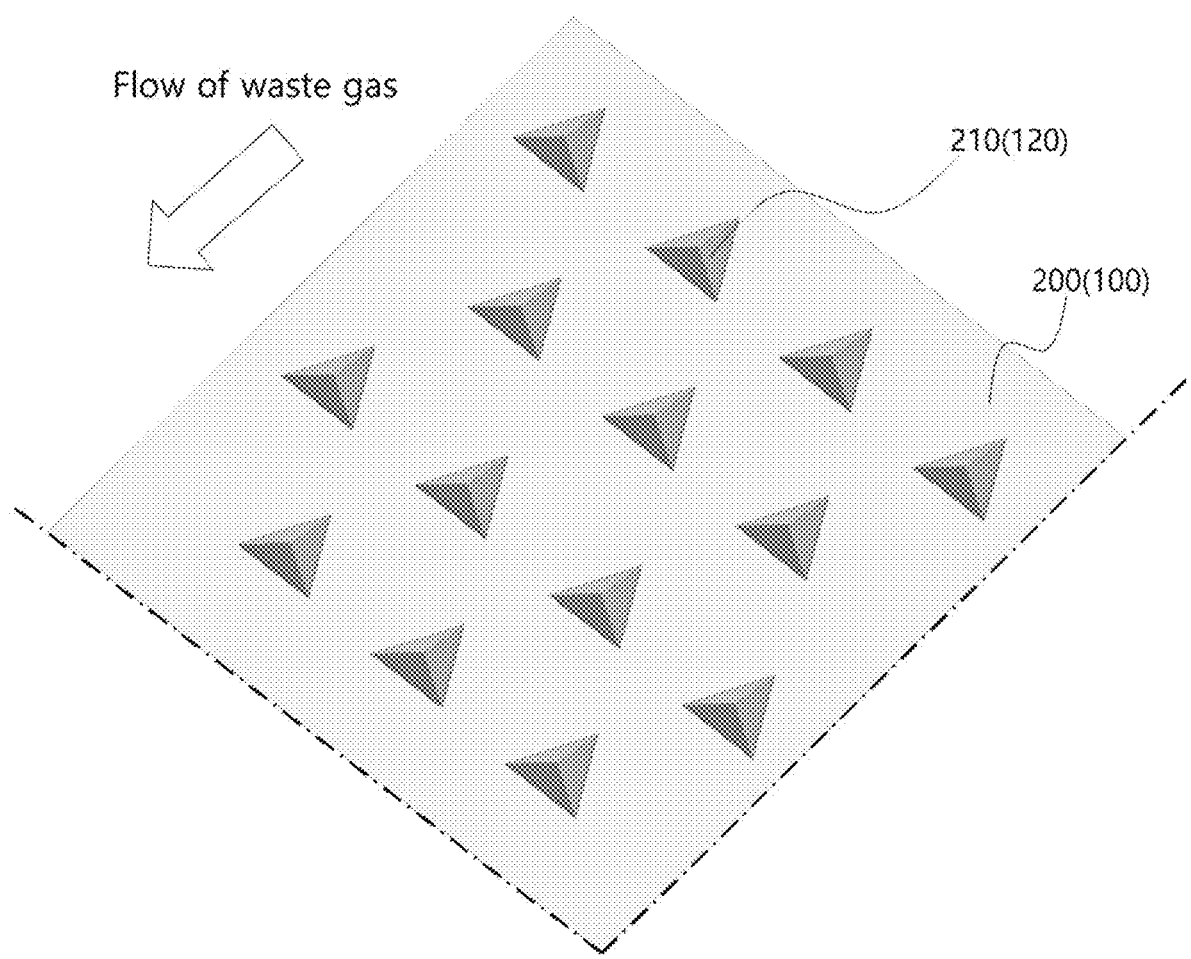
FIG. 2 is a perspective view for explaining the shape and arrangement of collecting protrusions according to an embodiment of the present disclosure.

FIG. 2 is a perspective view for explaining the shape and arrangement of the first and second collecting protrusions according to an embodiment of the present disclosure.

As shown in FIG. 2, the first and second collecting protrusions 120 and 210 according to an embodiment of the present disclosure are preferably formed in a quadrangular pyramid shape of which cross-sectional area increases rearward in a flow direction of waste gas.

Accordingly, it is possible to improve collection efficiency by increasing a contact area between the first and second collecting protrusions 120 and 210 with the waste gas, and it is possible to prevent the collected dust from being clogged on rear surfaces of the first and second collecting protrusions 120 and 210 to flow in a direction reverse to the flow of the waste gas.

In addition, in the present disclosure, it is preferable that the first and second collecting protrusions 120 and 210 are formed to protrude in a chessboard pattern alternately in front and rear rows in the flow direction of the waste gas.

Accordingly, even if the dust flows backward between the first and second collecting protrusions 120 and 210 in the $n+1^{th}$ row, it is possible to prevent the dust from being clogged on the rear surfaces of the first and second collecting protrusions 120 and 210 in the $n^{th}$ row to flow backward.

Meanwhile, when the dust moves in the flow direction of the waste gas, the dust may naturally move rearward along the sides or inclination of the first and second collecting protrusions 120 and 210.

In the present disclosure, the first and second collecting protrusions 120 and 210 are described as having a quadrangular pyramid shape, but may be formed and applied in various shapes such as a "<" shape or a " ⊂ " shape that can prevent a backflow of the dust while smoothly moving the dust in the forward direction as the flow direction of the waste gas.

In addition, the apparatus for treating waste gas of electronic industry according to an embodiment of the present disclosure may further include a dust transfer means 130, such as a vibrator, which is installed on an outer wall of the reaction chamber 100 so as to move the dust deposited on the top surface of the first partition plate 200 in a direction toward the dust gate 220.

Accordingly, by using the dust transfer means 130 to transfer the dust deposited on the top surface of the first partition plate 200 in the direction toward the dust gate 220, it is possible to facilitate dust discharge and maintenance.

More preferably, the apparatus for treating waste gas of the electronics industry according to an embodiment of the present disclosure further includes a third partition plate 600 extending upwardly from an end portion of the first partition plate 200.

Accordingly, the third partition plate 600 prevents the heat of the thermal decomposition zone 112a from being transferred to the pre-treatment zone 111, thereby improving thermal efficiency, preventing the pre-treatment zone 111 from being damaged at a high temperature, and preventing the dust of the pre-treatment zone 111 from flowing into the thermal decomposition zone 112a.

The second partition plate 300 is formed to extend vertically downward from a ceiling of the reaction chamber 100 adjacent to the outlet 102 so that the purification zone 112 is divided into the thermal decomposition zone 112a for thermally decomposing a perfluorinated compound and the post-treatment zone 112b.

In the present disclosure, the first, second, and third partition plates 200, 300, 600 are installed in the thermal decomposition zone as described above and preferably formed of a material having excellent heat resistance, and, if necessary, a heat-resistant coating layer may be coated on a surface facing the thermal decomposition zone 112a.

As described above, as the first, second, and third partition plates 200, 300, and 600 divide the inner space into the pre-treatment zone 111 for primarily collecting dust in waste gas, the thermal decomposition zone 112a for heating and thermally decomposing a perfluorinated compound in the waste gas and secondarily collecting dust generated in the thermal decomposition process, and the post-treatment zone 112b for removing at least one of a fluorine compound and nitrous oxide from the waste gas resulting from treatment of the perfluorinated compound, there are advantageous effects that one reaction chamber 100 is integrally integrated so as to treat a plurality of contaminants, such as dust, a perfluorinated compound, nitrous oxide, and the like, at the same time, thereby minimizing the volume and improving treatment efficiency.

The heater 400 is installed at a ceiling of the reaction chamber 100 so as to be located in the thermal decomposition zone 112a, and heats the waste gas introduced into the thermal decomposition zone 112a to a high temperature, thereby treating a perfluorinated compound in the waste gas by thermal reaction.

In the present disclosure, various types of heaters capable of thermally decomposing a perfluorinated compound by heating the waste gas, such as electric heaters and plasma heaters may be selectively applied as the heater 400, and it is preferable that the treatment temperature is relatively low and an electric heater capable of preventing damage to a catalyst or the like provided in a dry scrubber unit at the rear end is used.

At this point, the apparatus for treating waste gas of the electronics industry according to an embodiment of the present disclosure may further include one or more temperature sensors installed in the thermal decomposition zone 112a to measure the temperature of the thermal decomposition zone 112a.

Accordingly, it is possible to control the operation of the heater 400 according to the temperature of the thermal decomposition zone 112a measured in real time using a temperature sensor to improve thermal decomposition efficiency, and to prevent an increase in treatment cost and damage due to overheating.

In the dry scrubber unit 500 according to an embodiment of the present disclosure, in order to collect at least one of a fluorine compound and nitrous oxide in the thermally decomposed waste gas, one or more catalysts are sequentially disposed in the waste gas flow path formed between the second partition plate 300 and the inner wall of the other side of the reaction chamber 100.

More specifically, an adsorptive catalyst adsorbing and removing a fluorine compound generated from the decomposition of a perfluorinated compound, a nitrous oxide decomposition catalyst directly decomposing nitrous oxide, and the like may be a catalyst that can be used in the dry scrubber unit 500 according to an embodiment of the present invention, and it is preferable to use a catalyst having excellent corrosion resistance to fluorine.

The dry scrubber unit 500 according to an embodiment of the present disclosure has the advantageous effect of maximizing the efficiency of removal of pollutants and lowering the temperature of discharged gas by sequentially arranging the catalysts as described above.

More specifically, the dry scrubber unit 500 configured according to an embodiment of the present disclosure includes the following in the flow direction of waste gas: a first catalyst part 510 including a fluorine compound adsorptive catalyst so that a byproduct of the perfluorinated compound thermally decomposed by the heater 400 is used to secondarily treat the fluorine compound; a second catalyst part 530 installed at a rear end of the first catalyst part 510 and including a nitrous oxide decomposition catalyst to directly decompose and remove nitrous oxide in the waste gas; and a heat exchange part 540 disposed at a rear end of the second catalyst part 530.

The reason that the first catalyst part 510 is disposed first in the present disclosure is that a highly corrosive fluorine compound is absorbed and removed in the first catalyst part 510, thereby minimizing damage to the second catalyst part 530 and the heat exchange part 520, which are disposed after the first catalyst part 510.

Meanwhile, it is preferable that the third catalyst part 540 for removing dust is disposed at a front end of the heat exchange part 520, because an increase in temperature of exhaust gas may be suppressed and thermal efficiency may be improved by preventing lowering of heat exchange efficiency, which is caused by dust adhered to a surface of the heat exchange part 540.

In the present disclosure, waste heat recovered through the heat exchange part 520 may be used to preheat waste gas flowing into the inner space 110 through the inlet 101.

As described above, although the present disclosure has been disclosed with reference to a preferred embodiment, those skilled in the art will appreciate that various modifications, additions and substitutions are possible, without departing from the scope and spirit of the present disclosure as disclosed in the accompanying claims.

[Detailed Description of Main Elements]

| | |
|---|---|
| 100: reaction chamber | 101: inlet |
| 102: outlet | 110: inner space |
| 111: pre-treatment zone | 112: purification zone |
| 112a: thermal decomposition zone | 112b: post-treatment zone |
| 120: second collecting protrusion | 200: first partition plate |
| 210: first collecting protrusion | 220: dust gate |
| 300: second partition plate | 400: heater |
| 500: dry scrubber unit | 510: first catalyst part |
| 520: heat exchange part | 530: second catalyst part |
| 540: third catalyst part | 600: third compartment plate |

What is claimed is:

1. An apparatus for treating waste gas of electronic industry, the apparatus comprising:
    a reaction chamber in which an inlet and an outlet are formed, and an inner space for purifying waste gas is formed;
    a first partition plate extending from an inner wall of the reaction chamber, facing the inlet in a direction toward the inlet, dividing the inner space into a pre-treatment zone for collecting dust in the waste gas and a remaining purification zone;
    a second partition plate extending vertically downward from a ceiling of the reaction chamber, dividing the purification zone into a thermal decomposition zone for heating and thermally decomposing waste gas and a post-treatment zone; and
    a heater installed at the ceiling of the reaction chamber so as to be located in the thermal decomposition zone to thermally decompose a perfluorinated compound by heating waste gas introduced into the thermal decomposition zone; and
    a dry scrubber unit including one or more catalysts to collect at least one of the dust, a fluorine compound, and nitrous oxide (N2O) in waste gas introduced into the post-treatment zone.

2. The apparatus of claim 1,
    wherein the first partition plate is installed inclined upwardly in the direction toward the inlet from the inner wall of the reaction chamber, and a plurality of first collecting protrusions are formed to be spaced apart from each other in longitudinal and transverse directions on top and bottom surfaces of the first partition plate.

3. The apparatus of claim 2,
    wherein the first partition plate further comprises a dust gate installed adjacent to the reaction chamber to discharge dust collected on the top surface of the first partition plate to the pre-treatment zone.

4. The apparatus of claim 2, further comprising:
    a third partition plate extending upwardly from an end portion of the first partition plate so as to prevent a dust inflow and a heat loss into the thermal decomposition zone.

5. The apparatus of claim 1,
wherein the inlet is bent downward to supply waste gas to a bottom of the inner space.

6. The apparatus of claim 5,
wherein the reaction chamber further comprises a plurality of second collecting protrusions formed to be spaced apart in longitudinal and transverse directions, each protrusion formed in a quadrangular pyramid shape of which cross-sectional area increases from one side to the other side of the reaction chamber having the inlet formed therein so that dust deposited on the bottom of the inner space is prevented from flowing backward.

7. The apparatus of claim 1,
wherein the dry scrubber unit comprises:
   a first catalyst part configured to adsorb and treat the fluorine compound in the waste gas heated by the heater; and
   a heat exchange part installed at a rear end of the first catalyst part in a flow direction of waste gas to recover waste heat of the waste gas heated by the heater.

8. The apparatus of claim 7,
wherein the dry scrubber unit further comprises a second catalyst part installed between the first catalyst part and the heat exchange part to decompose and remove the nitrous oxide (N2O) in the waste gas heated by the heater.

9. The apparatus of claim 7,
wherein the dry scrubber unit further comprises a third catalyst part installed at a front end of the heat exchange part to adsorb and remove the dust in the waste gas.

* * * * *